United States Patent
Belke et al.

(10) Patent No.: US 10,632,472 B2
(45) Date of Patent: Apr. 28, 2020

(54) MACHINE FOR TRANSPORTING A LINER INTO A GRINDING MILL BODY

(71) Applicant: OUTOTEC (FINLAND) OY, Espoo (FI)

(72) Inventors: Jeff Belke, Mt Pleasant (AU); Rory Soutar-Dawson, North Beach (AU)

(73) Assignee: OUTOTEC (FINLAND) OY, Espoo (FI)

( * ) Notice: Subject to any disclaimer, the term of this patent is extended or adjusted under 35 U.S.C. 154(b) by 0 days.

(21) Appl. No.: 15/750,239

(22) PCT Filed: Aug. 18, 2016

(86) PCT No.: PCT/FI2016/050565
§ 371 (c)(1),
(2) Date: Feb. 5, 2018

(87) PCT Pub. No.: WO2017/029435
PCT Pub. Date: Feb. 23, 2017

(65) Prior Publication Data
US 2018/0311676 A1    Nov. 1, 2018

(30) Foreign Application Priority Data
Aug. 19, 2015    (AU) ................................ 2015903367

(51) Int. Cl.
*B02C 17/22*    (2006.01)
(52) U.S. Cl.
CPC .................................. *B02C 17/22* (2013.01)

(58) Field of Classification Search
CPC ....... B02C 17/22; B02C 17/00; B02C 17/181; B02C 17/24; B02C 17/1835;
(Continued)

(56) References Cited

U.S. PATENT DOCUMENTS 1,350,627 A * 8/1920 Ten Broeck .............. C10B 1/10
                                                          202/136
1,369,653 A * 2/1921 Hall ...................... B02C 17/183
                                                          241/171
(Continued)

FOREIGN PATENT DOCUMENTS

AU    2004201105 A1    10/2005
CN    104416353 A    3/2015
(Continued)

OTHER PUBLICATIONS

International Search Report issued by the Finnish Patent and Registration Office acting as the International Searching Authority in relation to International Patent Application No. PCT/FI2016/050565 dated Nov. 15, 2016 (6 pages).
(Continued)

*Primary Examiner* — Glenn F Myers
(74) *Attorney, Agent, or Firm* — Robert P. Michal, Esq.; Carter, DeLuca & Farrell LLP

(57) ABSTRACT

A machine and a method for transporting a liner into a grinding mill body wherein the machine includes a housing for insertion through an opening of the grinding mill body. The housing has a first end, a second end and a conduit in communication with the first end and the second end, and a conveying device for conveying the liner along the conduit between the first and second ends.

1 Claim, 7 Drawing Sheets

(58) Field of Classification Search
CPC ....... B02C 17/183; B02C 23/00; B02C 23/02; B02C 11/00; B02C 11/04; B02C 4/286; B02C 2/007; B65G 41/003
USPC .......................................................... 414/288
See application file for complete search history.

(56) References Cited

U.S. PATENT DOCUMENTS

| | | | | |
|---|---|---|---|---|
| 1,719,971 A | * | 7/1929 | Fahland | ................ B02C 17/183 198/657 |
| 1,883,493 A | * | 10/1932 | Berg | .................... B65G 41/003 193/5 |
| 3,350,018 A | * | 10/1967 | Harris | ..................... B02C 25/00 184/108 |
| 3,752,338 A | * | 8/1973 | Bartell | .................... B02C 17/22 414/732 |
| 3,802,150 A | | 4/1974 | Melton et al. | |
| 6,082,953 A | * | 7/2000 | Darley | ...................... B60P 3/03 414/390 |
| 2004/0201105 A1 | | 10/2004 | Narizuka et al. | |
| 2014/0224907 A1 | | 8/2014 | Moller et al. | |

FOREIGN PATENT DOCUMENTS

| | | |
|---|---|---|
| GB | 1352428 A | 5/1974 |
| SU | 418212 A1 | 3/1974 |

OTHER PUBLICATIONS

Written Opinion of the International Searching Authority issued by the Finnish Patent and Registration Office acting as the International Searching Authority in relation to International Patent Application No. PCT/FI2016/050565 date of completion Nov. 14, 2016 (7 pages).

International Preliminary Report on Patentability issued by the Finnish Patent and Registration Office acting as the International Preliminary Examining Authority in relation to International Patent Application No. PCT/FI2016/050565 date of completion Oct. 24, 2017 (6 pages).

Extended European Search Report issued by the European Patent Office in relation to European Patent Application No. 16836701.9 dated Jul. 26, 2018 (6 pages).

Brazilian Office Action issued by the Brazilian Patent Office in relation to Brazilian Application No. 112018002932-7 dated Jan. 14, 2020 (4 pages).

* cited by examiner

MACHINE FOR TRANSPORTING A LINER INTO A GRINDING MILL BODY

CROSS-REFERENCE TO RELATED APPLICATIONS

This application is a National Phase Entry under 35 USC § 371 of PCT Patent Application Serial No. PCT/F12016/050565 filed Aug. 18, 2016, which claims priority to Australian Patent Application No. 2015903367 filed Aug. 19, 2015, the disclosure of each of these applications is expressly incorporated herein by reference in their entirety.

FIELD OF THE INVENTION

The invention relates to a machine for transporting a liner into a grinding mill and in particular to a liner handling machine for a grinding mill. The invention has been developed primarily for use with a grinding mill for grinding mineral ore particles. However, it will be appreciated that the invention is applicable to grinding mills in general for use in the grinding of other particulate material, such as concrete, cement, recyclable materials (such as glass, ceramics, electronics and metals), food, paint pigments, abrasives and pharmaceutical substances.

BACKGROUND OF THE INVENTION

Grinding mills are typically used in mineral processing to grind mineral ore particles into smaller sized particles to facilitate further downstream processing, such as separation of the valuable mineral particles from unwanted gangue. The grinding mill typically has a lining to protect the inner surface of the mill body from damage during the grinding process. The lining is made up of several lining components, that are called 'liners', joined together to cover the inner surface of the mill body. The lining absorbs the impacts from the grinding media and particulate material being ground and so must be replaced once it is worn out or significantly damaged. This involves dismantling the lining into individual liners and then replacing the worn liners with new liners.

The installation and replacement of liners for grinding mills is a dangerous activity, taking place in a confined space and involving heavy pieces of equipment since liners can range from 50 kg up to many tonnes. Liner handling machines have been developed to improve worker safety in performing these tasks of installation and replacement. Conventional liner handling machines comprise a thick, solid main beam on which a conveying device delivers new liners along an upper side of the main beam along its length through an opening within an end of the grinding mill body. In operation, the main beam of the conventional liner handling machine is inserted through the opening of the grinding mill body into the grinding mill interior so as to minimise the amount manual handling of the liners by a worker. Cranes at either end of the main beam also allow lifting the liners to further reduce manual handling by workers, thus reducing the risk of injury. Thus, the liner handling machine enables the transport of liners from outside the grinding mill body into the inside of the grinding mill body, and vice-versa.

A problem with the state of the art liner handling machine is that the typical smallest main beam, being a beam around 400 mm deep and 600 mm wide, occupies a substantial cross-sectional area of the opening of the grinding mill body, which for example in a small grinding mill tends to be around 1450 mm to 1750 mm wide in diameter. Consequently, there is a limit as to the size of the liners that can be transported into the grinding mill body. Where grinding mills are of smaller capacity, the conventional liner handling machine cannot be used at all, as none of the liners can fit into the reduced opening of the grinding mill body caused by the main beam extending through the opening.

It is an object of the present invention to overcome or ameliorate at least one of the disadvantages of the prior art, or to provide a useful alternative.

SUMMARY OF THE INVENTION

A first aspect of the present invention provides a machine for transporting a liner into a grinding mill body, comprising a housing for insertion through an opening of said grinding mill body, said housing having a first end, a second end and a conduit in communication with said first end and said second end, and a conveying device for conveying said liner along said conduit between said first and second ends.

Preferably, said conveying device is located inside said conduit. In one embodiment, said conveying device is located towards a floor of said conduit.

It will be appreciated that the phrase "along said conduit" in the specification means that the liner is able to be conveyed inside or within the conduit, either in whole or in part. Thus, in one embodiment said liner is partly within said conduit. In other embodiments, said liner is contained inside said conduit.

Preferably, said conduit is partly enclosed. More preferably, a portion of said housing partly encloses said conduit to provide stiffening support to said housing and to protect the opening of said grinding mill body from damage by said liner. In one embodiment, said housing portion comprises at least two sidewalls. In other embodiments, said housing portion comprises curved sidewalls.

It is further preferred that said housing portion encloses a portion of said conduit. In one embodiment, said housing portion comprises one or more sidewalls that enclose said conduit portion. In some embodiments, said housing portion comprises a cylindrical or tubular section of said housing.

Preferably, said conduit is enclosed by said housing.

Preferably, said housing comprises a base and at least two sidewalls to define said conduit. More preferably, said conduit comprises a channel or trough. Alternatively, said conduit comprises a pipe or tube in said housing. More preferably, said conduit comprises a passage extending along or parallel to a longitudinal axis of said housing. In one embodiment, said passage comprises an internal passage in said housing.

Preferably, said conduit has a circular cross-section. In some embodiments, said conduit has a polygonal cross-section. In other embodiments, said conduit comprises a hexagonal, octagonal, arcuate, semi-circular, triangular, oval-like, rectangular, square or other polygonal cross-section.

Preferably, said housing comprises an elongated tubular body. More preferably, said housing comprises a plurality of sections joined together. In one embodiment, said sections are slidably moveable relative to one another. In a further embodiment, said housing comprises telescopic sections gradually decreasing in cross-section.

Preferably, said housing comprises one or more reinforcing elements to stiffen said housing. More preferably, said reinforcing elements are located adjacent at least one of said first and second ends of said housing. It is further preferred that said reinforcing elements are located adjacent said first and second ends of said housing. In one embodiment, said reinforcing elements extend transversely to a longitudinal axis of said housing. In some embodiments, said reinforcing elements extend along or parallel to a longitudinal axis of said housing. In other embodiments, said reinforcing elements extend at an angle to a longitudinal axis of said housing. In further embodiments, at least one of said reinforcing elements comprises a rib, stud or flange.

Preferably, said conveying device comprises a roller conveyer. Alternatively or additionally, said conveying device comprises a conveyor belt. In an alternative embodiment, said conveying device comprises a carriage slidably moveable on a track along said conduit. In a further embodiment, said track comprises a monorail located adjacent a top of said housing, said carriage being slidably moveable on said monorail.

Preferably, said machine comprises a moveable frame for mounting said housing. More preferably, said moveable frame comprises wheels. Alternatively, said moveable frame comprises tracked wheels.

Preferably, said machine comprises at least one crane for lifting said liner from and to said housing. More preferably, said at least one crane is mounted to one end of said housing. In one embodiment, said machine comprises two of said cranes, wherein said cranes are mounted to opposite ends of said housing.

A second aspect of the present invention provides the use of the machine of the first aspect of the invention for transporting a liner through an opening of a grinding mill body.

Preferably, said opening of said grinding mill body has a diameter from 400 mm to 4500 mm, preferably from 750 mm to 2750 mm, more preferably from 1000 mm to 2500 mm, even more preferably from 1250 mm to 2000 mm and most preferably from 1450 mm to 1750 mm.

A third aspect of the present invention provides a method for transporting a liner into a grinding mill body having an opening, said method comprising:

inserting a housing through an opening of said grinding mill body, said housing comprising a first end, a second end and a conduit in communication with said first end and said second end; and conveying said liner along said conduit between said first and second ends.

Preferably, said method comprises locating a conveying device inside said conduit. In one embodiment, said method comprises locating said conveying device towards a floor of said conduit.

Preferably, said method comprises conveying said liner partly within said conduit. More preferably, said method comprises conveying said liner inside said conduit.

Preferably, said method comprises removing said housing through said opening after conveying said liner.

Preferably, said method comprises partly enclosing said conduit to provide stiffening support to said housing and to protect the opening of said grinding mill body from damage by said liner. More preferably, a portion of said housing partly encloses said conduit. In one embodiment, said housing portion encloses a portion of said conduit.

Preferably, said method comprises forming said conduit as a channel or trough. Alternatively, said method comprises forming said conduit as a pipe or tube in said housing. More preferably, said conduit comprises a passage extending along or parallel to a longitudinal axis of said housing.

Preferably, said method comprises forming said conduit with a circular cross-section. In some embodiments, said method comprises forming said conduit with a polygonal cross-section. In other embodiments, said method comprises forming said conduit with a hexagonal, octagonal, arcuate, semi-circular, triangular, oval-like, rectangular, square or other polygonal cross-section.

Preferably, said method comprises providing said housing with one or more reinforcing elements to stiffen said housing. More preferably, said method comprises locating said reinforcing elements adjacent at least one of said first and second ends of said housing. It is further preferred that said method comprises locating said reinforcing elements adjacent said first and second ends of said housing. In one embodiment, said method comprises locating said reinforcing elements on said housing so that said reinforcing elements extend transversely to a longitudinal axis of said housing. In some embodiments, said method comprises locating said reinforcing elements on said housing so that said reinforcing elements extend along a longitudinal axis of said housing. In other embodiments, said method comprises locating said reinforcing elements on said housing so that said reinforcing elements extend at an angle to a longitudinal axis of said housing. In further embodiments, said method comprises forming at least one of said reinforcing elements as a rib, stud or flange.

Preferably, said method comprises mounting said housing on a moveable frame.

Preferably, said method comprises providing at least one crane for lifting said liner from and to said housing. More preferably, said method comprises mounting said at least one crane to one end of said housing. In one embodiment, said method comprises mounting two of said cranes to opposite ends of said housing.

The method of the third aspect of the invention has the preferred features of the first aspect of the invention, where applicable.

Unless the context clearly requires otherwise, throughout the description and the claims, the words "comprise", "comprising", and the like are to be construed in an inclusive sense as opposed to an exclusive or exhaustive sense; that is to say, in the sense of "including, but not limited to".

Furthermore, as used herein and unless otherwise specified, the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

BRIEF DESCRIPTION OF THE DRAWINGS

Preferred embodiments of the invention will now be described, by way of example only, with reference to the accompanying drawings in which.

PREFERRED EMBODIMENTS OF THE INVENTION

Figure 1:
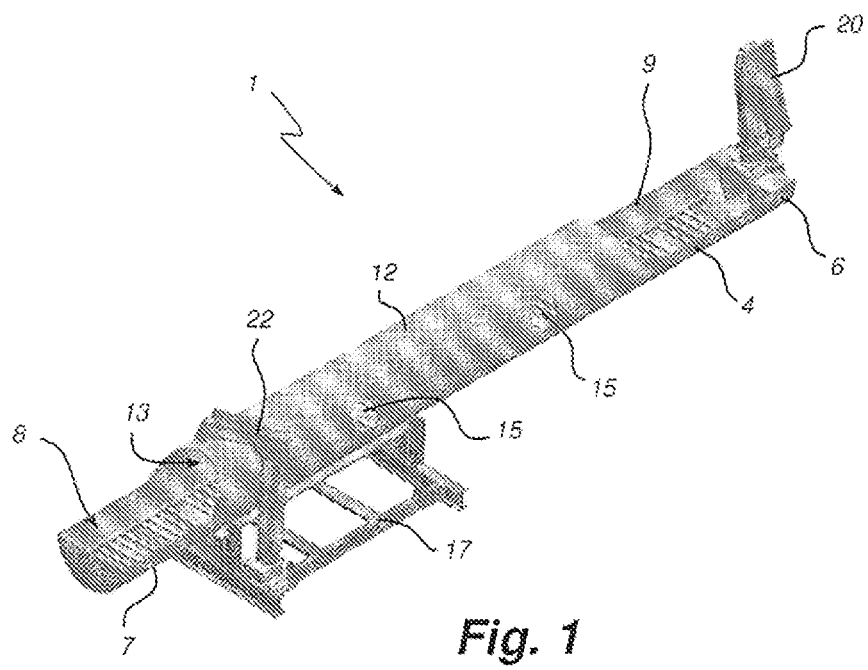
FIG. 1 is a perspective view of a machine for transporting a liner into the grinding mill body, according to an embodiment of the invention.
Figure 2:
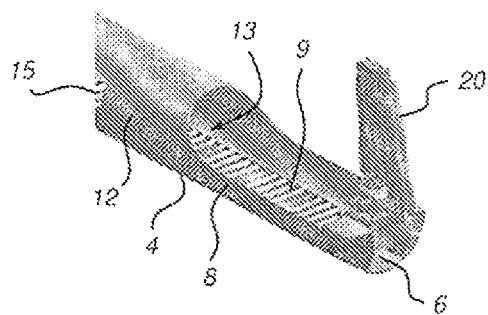
FIG. 2 is a partial perspective view of the machine in FIG. 1.

The present invention will now be described with reference to the following examples which should be considered in all respects as illustrative and non-restrictive. In the Figures, corresponding features within the same embodiment or common to different embodiments have been given the same reference numerals.

Figure 3:
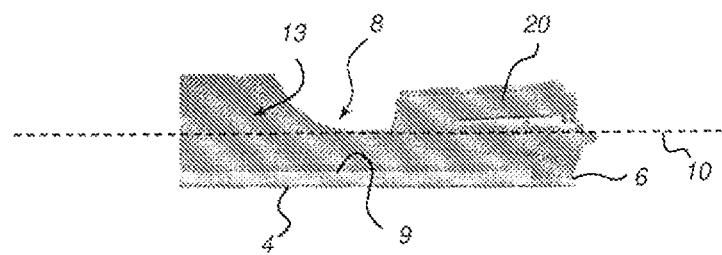
FIG. 3 is a partial cross-sectional view of the machine of FIG. 1.
Figure 4A:
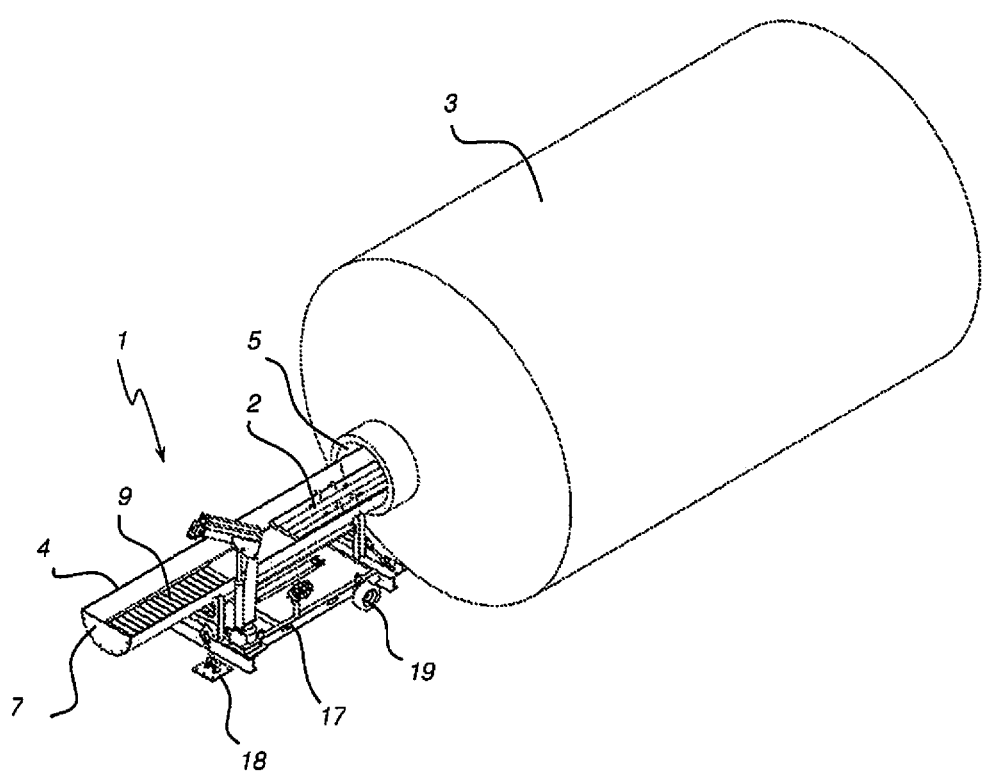
FIGS. 4A and 4B are perspective and cross-sectional perspective views of the machine of FIG. 1 with a grinding mill body.
Figure 4B:
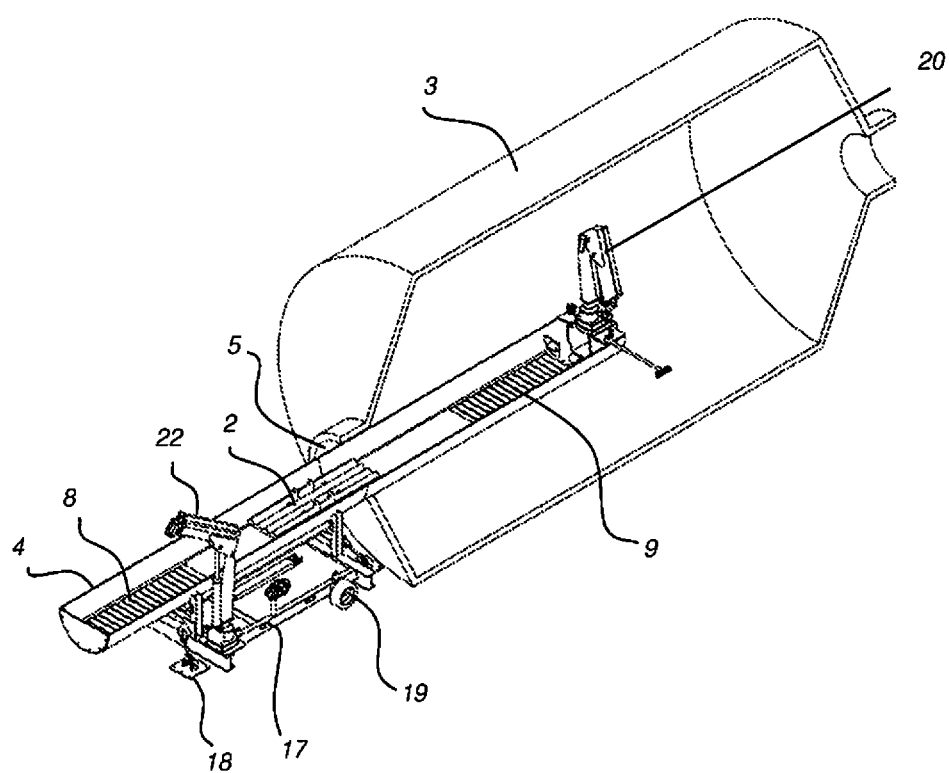

Referring to FIGS. 1 to 4B, a machine 1 for transporting a liner 2 into a grinding mill body 3 comprises a housing 4 for insertion through an opening 5 of the grinding mill body, as best shown in FIGS. 4A and 4B. The housing 4 has a first end 6, a second end 7 and a conduit 8 in communication with the first and second ends. In this embodiment, the first and second ends 6, 7 are opposite ends of the housing 4. A conveying device 9 for conveying the liner 2 along the conduit 8 between the first and second ends 6, 7.

In this embodiment, the conduit 8 takes the form of a passage that is partly enclosed and extends along a longitudinal axis 10 of the housing 4, as best shown in FIG. 3. The use of a housing 4 with a conduit 8 for transporting the liner 2 maximises the available cross-sectional area or space at the opening 5, thus enabling liners 2 with a large cross-section to be transported into the grinding mill body 3. Consequently, as larger liners 2 can be transported compared to the prior art, a lower number of liner pieces are required, making the installation and/or replacement with new liners 2 quicker and thus more efficient. In addition, it enables the machine 1 to be used for grinding mill bodies 3 that have smaller openings which previously could not use conventional liner handling machines as the thickness of the main beam obstructed the entry of any liners 2 into the grinding mill body 3. It will be appreciated that in other embodiments, the conduit 8 need not be a partly enclosed passage but can be a channel or trough that is open or partly open, as well as an enclosed pipe or tube. However, it is preferred that the housing 4 is at least cut away at its opposite ends 6, 7 to facilitate access to the passage 8 for lifting the liner 2 to and from the machine 1.

The housing 4 has a generally elongated tubular body, a portion 12 of which encloses a portion 13 of the conduit 8 and in this embodiment comprises a tubular or cylindrical section 12 in the middle of the housing 4. The enclosed tubular section 12 provides sufficient stiffness to the housing 4 when bearing the weight of the liner 2 (which can be many tonnes but typically up to 1,000 kg or 1 tonne) and also protects the opening 5 from damage as the liner 2 is transported into and out of the grinding mill body 3. In other embodiments, the housing portion 12 only partly encloses the conduit portion 13 or conduit 8. For example, the housing portion 12 may take the form of two sidewalls on either side of the conduit 8 that extend either along portion 13 or the entire length of the conduit 8, so as to define the conduit 8 or its portion 13 as a channel or trough. Alternatively, the sidewalls may be curved on either side but do not touch. The stiffness support and protective advantages stated above are conferred by the partly enclosed and fully enclosed configurations for the housing portion 12.

The tubular section 12 also has access ports 15 for enabling manual access to the enclosed portion of the conduit 8. This allows manual repositioning of the liner 2 if it comes out of alignment as it moves along the conduit 8 and potentially causes a blockage.

The conveying device 9 comprises a roller conveyor that is located towards the bottom of the housing 4 in the passage 8. This facilitates maximising the available cross-sectional area or space in the passage 8 to enable larger sized liners 2 to be transported through the opening 5 into the grinding mill body 3. In other embodiments, the conveying device 9 comprises a conveyor belt or a carriage slidably moveable on a track in the passage 8, where the track is located at the bottom of the housing 4. In some embodiments, the conveying device 9 is located towards the top of the housing 4 in the passage 8, with the liner 2 suspended from the conveying device as it is transported along the passage 8. For example, an overhead or suspended conveyor with a track located at the top of the housing 4 may be used in this alternative embodiment. The conveying device may also take the form of a carriage suspended on a monorail at the top of the housing 4, the carriage carrying the liner 2 as it slidably moves along the monorail between the ends 6, 7 of the housing.

The housing 4 is mounted to a moveable frame 17 for moving the housing into and out of the grinding mill body 3 through the opening 5. In this embodiment, the moveable frame 17 comprises wheels 19, as best shown in FIGS. 4A and 4B. The wheels can be rail-type wheels, which permit axial movement only, or transverse rail-type wheels that permit transverse movement as well as axial movement. In some embodiments, the moveable frame 17 is moved into and out of position using a forklift or crane. The machine 1 also has a crane 20 mounted to one end 6 and a crane 22 fitted to the moveable frame 17 adjacent the opposite end 7 for lifting the liner 2 to and from the roller conveyor 9 in the housing 4.

In operation, the machine 1 is moved via its wheels 19 so that the housing is inserted through the opening 5 into the grinding mill body 3 and the tubular section 12 extends on either side of the opening 5, as best shown in FIGS. 4A and 4B. For ease of reference, the housing portion 12 has been omitted for the purposed of clarity. The crane 20 at the inserted end 6 is put into a retracted position lying in the passage 8, as best shown in FIG. 3, to reduce its cross-sectional profile, thus permitting entry of the housing end 6 into the grinding mill body 3. The cranes 20, 22 inside and outside the grinding mill body 3 are then moved into their operational positions, as best shown in FIG. 1. A liner 2 is then moved next to the housing 4 adjacent the end 7 outside of the grinding mill body 3. The crane 22 adjacent the end 7 lifts the liner 2 and places it onto the roller conveyor 9, which then operates to convey the liner 2 along the passage 8 from the outside end 7 to the opposite end 6 inside the grinding mill body 3. The tubular section 12 protects the opening 5 from the liner 2 while providing the necessary structural support to the housing 4 so that it does not buckle under the weight of the liner 2. The liner 2 can be repositioned where necessary as it moves along the passage 8, including when within the tubular section 12 via the access holes 15. Upon reaching the housing end 6 inside the grinding mill body 3, the crane 20 lifts the liner 2 from the roller conveyor 9 and then moves the liner 2 into position for mounting to the interior of the grinding mill body 3. This typically requires manual involvement for correctly placing the liner 2 into position and then mounting the liner 2. The process is repeated for each liner 2 until the lining is mounted to the interior of the grinding mill body 3. Once the liners 2 have been installed, the crane 20 is returned to its retracted position and the housing 4 is then removed through the opening 5 to withdraw the machine 1 out of the grinding mill body 3.

Where the lining of the grinding mill body 3 is being replaced, the machine 1 is inserted into the grinding mill body 3 and old lining is first removed piece by piece, with the old liners being placed by the crane 20 onto the roller conveyor 9. The liner 2 is then conveyed along the passage 8 by the roller conveyor 9 from the housing end 6 to the opposite housing end 7, where it is removed by the crane 20. The new liner 2 is transported into the grinding mill body 3 as described above and installed where the old liner was mounted to the grinding mill body. This process is repeated until all the old liners are progressively replaced with new liners 2. This progressive replacement of the old liners minimises turning or rotating the grinding mill body 3, thus reducing the shutdown period for the grinding mill. To remove all the old liners and then install the new liners would involve more time and so would extend the shutdown period. It can be seen from this description that the invention provides numerous advantages over conventional liner handling machines. In the invention, there is more space available at the opening 5 of the grinding mill body 3 for the liner 2 to fit through, due to the housing 4 having a conduit 8 for transporting the liner 2. This available space is further maximised by placing the conveying device 9 towards the base or top of the conduit 8. The partly enclosing housing portion 12 also provides sufficient structural strength to the machine 1 to support the weight of the liner 2 without compromising this maximised available space. Consequently, the machine 1 has a greater capacity to transport liners 2 having a larger size into the grinding mill body 3 through the opening 5, as well as being able to transport liners 2 for smaller grinding mill bodies that have smaller openings. In addition, the provision of a housing portion 12 that partly encloses the conduit 8 protects the opening 5 of the grinding mill body 3 from damage by the liner 2. The housing portion 12 also prevents the liner 2 falling off or out of the housing 4 as it moves from the outside end 7 to the inside end 6, and vice-versa, reducing the risk of damage to the liner 2 and injury to workers using the machine 1. A further advantage is that personnel can be transported into and out of the grinding mill body 3 using a stretcher placed on the conveying device 9, thus improving access to the grinding mill body and providing a safe means of moving personnel not previously available where a worker has suffered an injury inside the grinding mill body 3. Thus, the invention provides a safer, more efficient means of installing and/or replacing liners for a grinding mill body.

In contrast, conventional liner handling machines are limited in the size of the liner size that can be transported into the grinding mill body since the thick, solid main beam occupies a substantial part of the available space, being around 400 mm deep by 600 mm wide compared to the opening 5 of the grinding mill body 3 having a typical diameter of around 1450 mm to 1750 mm. The main beam also occupies space that includes the area below the centre line of the opening 5, which is preferably required to move the liner 2. Also, the main beam does not provide any protection to the grinding mill body opening from damage caused by the liner 2 impacting the opening at it enters the grinding mill body. The main beam also does not provide any side support to prevent a liner 2 falling over the side of the main beam during transport, thus presenting a risk of damage to the liner 2 or injury to workers operating the conventional liner handling machine 1. Moreover, the conventional liner handling machine is unable to be used for smaller grinding mill bodies as the thick main beam obstructs the opening to prevent the transport of the liner into the grinding mill body. Furthermore, personnel are unable to be readily transported using the conventional liner handling machine, thus requiring the conventional liner handling machine to be moved out of the grinding mill body when personnel need to move into and out of the grinding mill body, especially where there is an injured worker inside the grinding mill body.

Figure 5A:
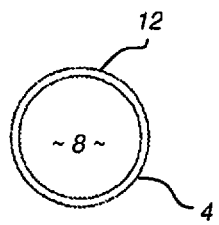
FIGS. 5A, 5B, 5C, 5D, 5E and 5F are end cross-sectional views of alternative embodiments of the invention.
Figure 5B:
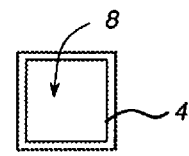
Figure 5C:
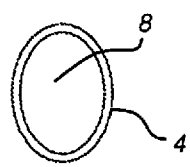
Figure 5D:
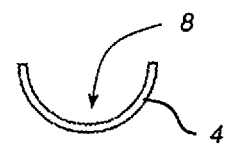
Figure 5E:
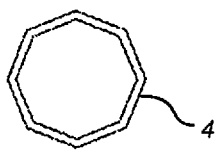
Figure 5F:
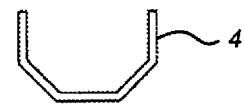

While the embodiment has been described and illustrated as having a conduit with a circular cross-section, as best shown in FIG. 5A, it will be appreciated that in other embodiments, the conduit has other cross-sectional shapes. For example, the conduit 8 may have a hexagonal, octagonal, arcuate, semi-circular, triangular, oval-like, rectangular, square or other polygonal cross-section. The conduit may also have an irregular cross-sectional shape if so desired. FIGS. 5B to 5F illustrate examples of some of these possible cross-sections for the conduit 8. FIG. 5B illustrates a conduit 8 having a rectangular or square cross-sectional; FIG. 5C illustrates a conduit 8 having an oval or ovoid cross-section; FIG. 5D illustrates a conduit 8 having an arcuate or semi-circular cross-section; FIG. 5E illustrates a conduit 8 having a hexagonal cross-section and FIG. 5F illustrates a conduit 8 having a half-hexagonal cross-section.

Figure 6A:
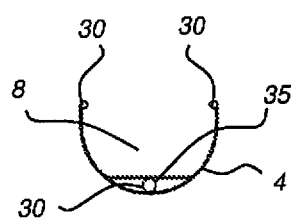
FIGS. 6A, 6B and 6C are perspective views of a machine according to other embodiments of the invention.
Figure 6B:
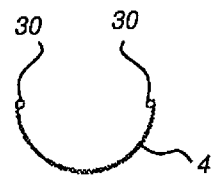
Figure 6C:
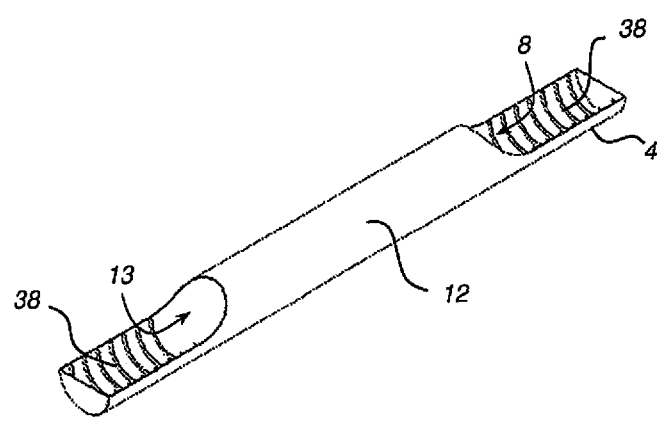

Referring to FIGS. 6A and 6B, another embodiment of the invention is illustrated, where the housing 4 has one or more reinforcing elements 30 to stiffen the housing and thus provide structural support to the machine 1 when bearing the load of a liner 2, which can typically reach up to 1,000 kg or greater in mass. In the embodiments of FIGS. 6A and 6B, the reinforcing elements take the form of ribs 30 that are situated near the edges of the housing 4 along its length or parallel to its longitudinal axis 10. In FIG. 6A another reinforcing rib is located beneath a floor 35 of the conduit 8 while there is no such rib or floor in FIG. 6B. A further embodiment is illustrated in FIG. 6C, where reinforcing ribs 38 extend at an angle to the longitudinal axis 10, similar to a helical pattern. In other embodiments, the ribs 38 extend transversely or longitudinally parallel to the longitudinal axis 10 of the housing 4. In further embodiments, the reinforcing elements 30, 38 are located only at the ends 6, 7 of the housing 4. Moreover, in some embodiments, the reinforcing elements comprise flanges or studs.

Figure 7A:
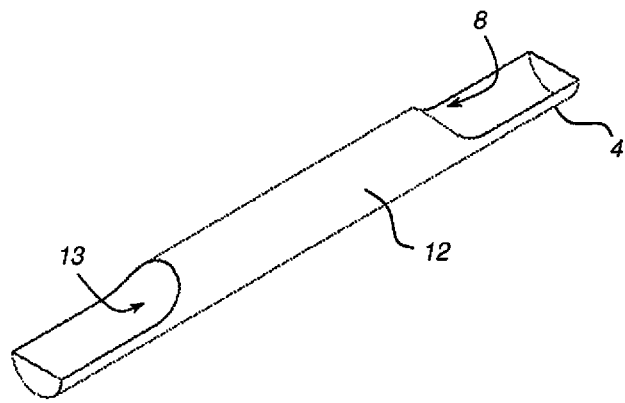
FIGS. 7A, 7B, 7C and 7D are perspective views of different housing configurations for the machine according to yet further embodiments of the invention.
Figure 7B:
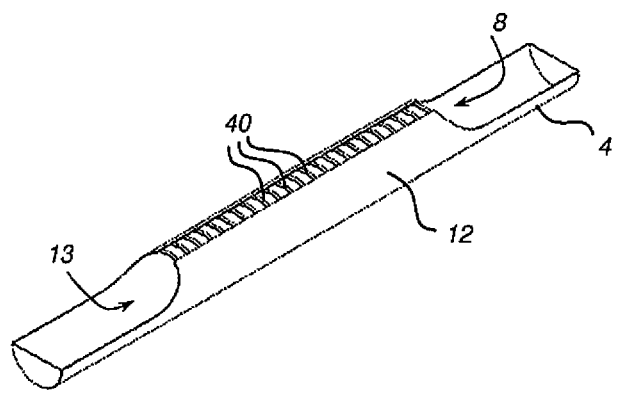
Figure 7C:
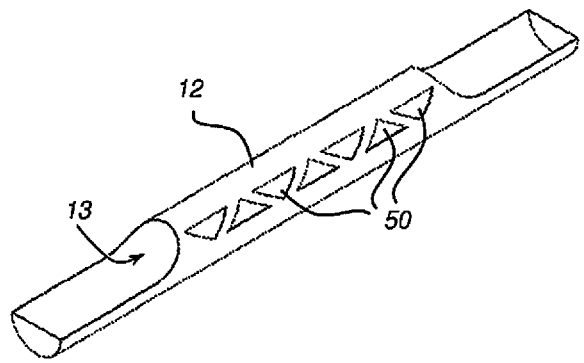
Figure 7D:
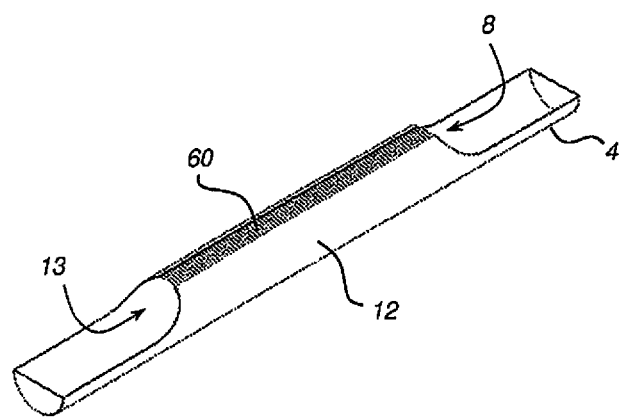

Referring to FIGS. 7A to 7D, further configurations for the housing 4 are illustrated, where FIG. 7A shows a basic configuration corresponding to the housing 4 illustrated in FIGS. 1 to 4B. FIG. 7B shows a configuration where the housing portion 12 comprises sidewalls that are curved and are connected by bridging ribs 40, which permit access to the enclosed portion 13 of the conduit 8 (similar to the access holes 15) while still providing sufficient stiffening support to the housing 4. FIG. 7C shows a housing 4 where the housing portion 12 has cut-away sections 50 on either side, again to permit access to the enclosed portion 13 of the conduit 8 while still providing sufficient stiffening support to the housing 4. FIG. 7D shows a housing 4 with the same housing portion 12 as shown in FIG. 7B, but instead of bridging ribs 40, a mesh 60 connects the sidewalls of the housing portion 12.

In some embodiments, there are multiple housing portions 12 along the length of the housing 4 to partly or fully enclose multiple portions 13 of the conduit 8 to provide greater access to the conduit 8 while maintaining a strong structure for the machine 1 to bear heavier liners 2. In other embodiments, the conduit 8 is fully enclosed by the housing 4, with housing ends 6, 7 having open platforms to receive and deliver the liner 2 to the conveying device 9 in the conduit 8.

In yet another embodiment, the housing 4 comprises telescopic sections that gradually reduce in cross-section to enable the machine to be used in grinding mill bodies that that floor space limitations that would prevent insertion of the housing 4 into the grinding mill body.

It will further be appreciated that any of the features in the preferred embodiments of the invention can be combined together and are not necessarily applied in isolation from each other. For example, there may be reinforcing elements 30 used in combination with multiple housing portions 12 to partly enclose the conduit 8 to provide further structural support and protection. Similar combinations of two or more features from the above described embodiments or preferred forms of the invention can be readily made by one skilled in the art.

By providing a housing 4 with a conduit 8 for transporting the liner 2, the invention provides numerous advantages over conventional liner handling machines. There is more space available to transport liners 2 at the opening 5 of the grinding mill body 3, thus enabling liners 2 having a larger size to be used. Also, this greater space means that the machine 1 can be used to transport liners 2 for smaller grinding mill bodies that have smaller openings, which were previously not permissible using conventional liner handling machines. The machine 1 is sufficiently strong to support the weight of the liner 2 without compromising this available transport space, protects the opening 5 of the grinding mill body 3 from damage by the liner 2, prevents or reduces the liner 2 falling off or out of the machine and thus the risk of damage to the liner 2 and injury to workers. Moreover, the machine 1 enables personnel to be transported into and out of the grinding mill body 3, thus improving access to the grinding mill body and providing a safe means of moving injured personnel not previously available. Thus, the invention provides a safer, more efficient means of installing and/or replacing liners for a grinding mill body. Thus, in all these respects, the invention represents a practical and commercially significant improvement over the prior art.

Although the invention has been described with reference to specific examples, it will be appreciated by those skilled in the art that the invention may be embodied in many other forms.

The invention claimed is:

1. A method for transporting a liner into a grinding mill body having an opening, the method comprising:
    inserting a housing through the opening and into the grinding mill body, the housing comprising a first end, a second end and a conduit in communication with the first end and the second end, wherein a first portion of the housing is cut away adjacent the first end and a second portion of the housing is cut away adjacent the second end such that the conduit is partly enclosed;
    conveying the liner along the conduit between the first end inserted inside the grinding mill body and the second end; and
    further comprising locating a conveying device inside the conduit.

* * * * *